United States Patent [19]

Boyd

[11] 4,335,605

[45] Jun. 22, 1982

[54] MASS FLOW METER

[75] Inventor: Branin A. Boyd, Malvern, Pa.

[73] Assignee: Thermal Instrument Company, Trevose, Pa.

[21] Appl. No.: 149,167

[22] Filed: May 14, 1980

[51] Int. Cl.³ .............................................. G01F 1/68
[52] U.S. Cl. ..................................................... 73/204
[58] Field of Search ................................. 73/204, 189

[56] References Cited

U.S. PATENT DOCUMENTS

| 3,742,476 | 6/1973 | Withrow | 73/204 X |
| 4,043,196 | 8/1977 | Trageser | 73/204 |
| 4,196,622 | 4/1980 | Peter | 73/204 |

OTHER PUBLICATIONS

Brochure, "Thermal Solves the Tough Flow Measurement Problems,", Thermal Instrument Co.
Technical Bulletins No. 672B, No. 628 D, and No. 683A, Thermal Instrument Co.
King, L. V., "On the Convection of Heat from Small Cylinders in a Stream of Fluid: Determination of the Convection Constants of Small Platinum Wires with Application to Hot-Wire Anemometry", Phil. Trans. Roy. Soc. Lond., Series A, vol. 214, Nov. 13, 1914, pp. 373-432.

Primary Examiner—Jerry W. Myracle
Attorney, Agent, or Firm—Lane, Aitken, Kice & Kananen

[57] ABSTRACT

A method and apparatus for applying in rapid sequence excitation voltages of significantly different amplitude to a flow transducer having a resistive temperature sensor in circuit with a reference resistor, analyzing the resetting output signals from the flow transducer and reference resistor under the two states of excitation, and computing a physical characteristic of a material such as its mass flow rate through a conduit from those resulting output signals.

30 Claims, 8 Drawing Figures

MASS FLOW METER

BACKGROUND OF THE INVENTION

This invention relates to a flow meter for measuring the mass rate of flow of a fluid. More particularly, this invention relates to a mass flow meter and flow measurement system for measuring the mass rate of flow of a fluid. Still more particularly, this invention relates to a mass flow meter utilizing pulse excitation and subsequent wave form analysis to calculate the Reynolds Number of the flow and to derive the mass flow rate from that calculation.

There are a significant number of applications which require a precise measurement of the mass flow rate of a fluid, particularly in the areas of process monitoring and control. Accordingly, a number of approaches have been developed for performing such a measurement and, on a historical basis, have largely involved mechanical or electromechanical techniques.

The measurement of fluid mass flow rate or velocity by utilizing thermal transfer techniques is well known. An example of one such device is the hot wire anemometer which was in general use and analyzed by King as early as 1914. In such devices generally, a heated element is placed in thermal contact with the flowing fluid and the rate of heat transfer from the heated element to the flowing fluid is measured. The rate of heat transfer is directly proportional to the flow Reynolds Number and generally follows the formula:

$$H = A + BR_e^\alpha P_R^\beta \qquad (1)$$

where:
H is the thermal transfer coefficient;
A & B are constants;
$R_e$ is the Reynolds Number;
$\alpha$ is the Reynolds power;
$P_R$ is the Prandtl Number; and
$\beta$ is the Prandtl power.

The Reynolds Number can be expressed by the equation:

$$R_e = EW/d\mu \qquad (2)$$

where:
E is a constant;
W is the mass flow rate;
d is the pipe inside diameter; and
$\mu$ is the fluid viscosity. From this equation it can be readily seen that the relationship between W, the mass flow rate, and H, the coefficieint of the heat transfer can be interpreted by common instrumentation directly into terms of mass flow rates. There are several commercial applications of this technology.

A basic difficulty with current devices applying thermal transfer techniques is that, in order to achieve a practical sensitivity, the temperature difference between the heated element and the flowing fluid must be on the order of 10° C. to 30° C. Unfortunately, there are a number of fluids which cannot tolerate this heating without undesirable chemical changes. In addition, there are also fluids which have the tendency to deposit upon or coat any surface which is but a few degrees different from, either above or below, the process temperature. Examples of such fluids are blood, latex, epoxies, starch, and fine clay suspensions.

It is thus a basic aim of this invention to provide a flow meter utilizing thermal techniques which avoids the need for significant temperature differences between the heated element and flowing fluid while continuing to achieve a practical sensitivity for commercial application, such as on the order of 1 to 2 percent or better.

In the semiconductor field, thermal pulses of very short duration have been used to measure the properties of insulating and conducting crystals. The heat pulse experiments to measure those properties utilized as basic elements a small heater or thermal transducer to produce an excitation of a known pulse width and a thermal receiver whose response is proportional to the incident thermal flux. An example of this application in the semiconductor field utilizes an evaporated thin film heater and detector circuits on opposite polished faces of a crystal.

However, such thermal pulse techniques have not apparently been applied to the manufacture of commercial flow meters. Thus, an additional general object of this invention is to provide a flow meter for measuring the mass rate of flow of a fluid utilizing pulse excitation techniques to permit a wave analysis of the response of the flow transducer to the excitation pulse in order to calculate the Reynolds Number and derive the mass flow rate from that calculation.

It is another overall purpose of this invention to retain all of the advantages of the thermal transfer technology while eliminating the problems of excessive flow element temperatures. In addition, the flow meter according to the invention will provide the advantage of greatly simplified transducers and the ability to use common electronics for multiple flow transducers as will be described in detail in the specification.

BRIEF SUMMARY OF THE INVENTION

Directed to achieving the aforestated objects of the invention, the flow meter according to the invention comprises a flow transducer having a foil or thin wire temperature sensor. The temperature sensor is bonded, such as by epoxy, to a wall of a fluid-carrying conduit containing the flow of fluid whose mass flow rate is to be determined. A protective covering is provided over the temperature sensor and acts as a thermal barrier to prevent heat loss to an area other than the flowing fluid. The flow transducer further includes a portion of the fluid-carrying conduit and the necessary fittings to connect that portion of the conduit to the remainder of the process piping.

Means are provided to supply a low excitation voltage to the temperature sensor and to a reference resistor in series circuit with the temperature sensor. After the respective voltage drops across the temperature sensor and the reference resistor are determined while the sensor and the resistor are in a state of low voltage excitation and stored for later computation, a high voltage is supplied to the temperature sensor and the reference resistor. The respective voltage drops across the temperature sensor and the reference resistor are determined while the sensor and resistor are in a state of high voltage excitation, and are stored for computation. From these data, the temperatures of the temperature sensor under the respective low voltage and high voltage excitation conditions are calculated. Since the power input to the temperature sensor in the high voltage state is determined by $E^2/R$, the thermal transfer coefficient can then be calculated. Once the thermal transfer coefficient is determined, the Reynolds Number for the particular mass flow rate of the fluid can then be computed. Thereafter, the mass flow rate of the fluid can be computed from the Reynolds Number. In summary, by knowing the voltage drops across a temperature sensor and a reference resistor under two conditions of voltage excitation of each, the flow rate of a fluid in a conduit to which the temperature sensor is secured can be determined.

Means are provided for controlling the application of the respective voltage excitation and computing from the data thus generated the fluid flow rate as described. The controlling and computing means include a central processing unit, a read-only memory, a random access read and write memory, a digital to analog converter and an analog to digital converter interconnected and programmed to perform the stated functions and computations. The digital to analog converter and analog to digital converter are multi-channel devices. Each channel of the digital or analog converter is in circuit with a power amplifier, the flow transducer which includes the temperature sensor, and a reference resistor. Thus, the system is capable of digital computation and display of the results. A flow diagram from the controlling and computing means is disclosed containing the process steps using the flow meter according to the invention.

In addition to the flow meter and system described above, the method of using the flow meter according to the invention is also disclosed.

These and other features are described in the written description of the invention which follows, taken in conjunction with the accompanying drawings.

DETAILED DESCRIPTION OF THE PREFERRED EMBODIMENTS

Figure 1:
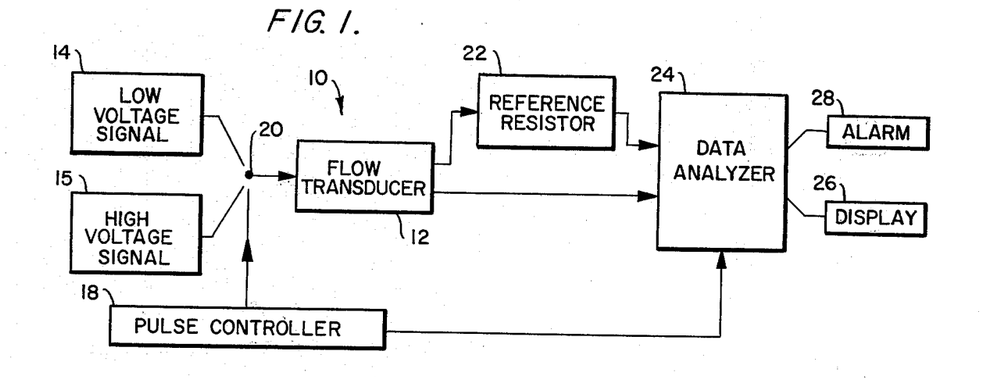
FIG. 1 is a block diagram of the essential components of the mass flow meter system according to the invention.
Figure 4:
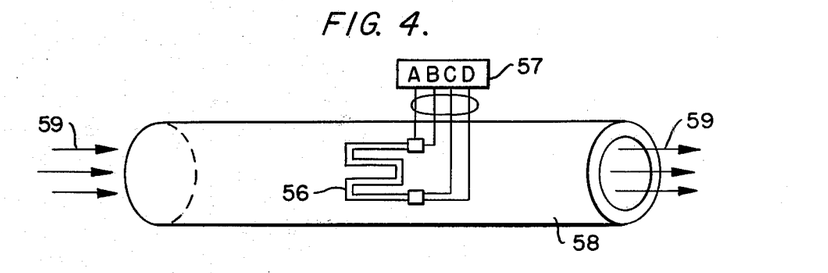
FIG. 4 illustrates a foil-type temperature sensor of the flow transducer secured to a flow containing conduit.
Figure 5:
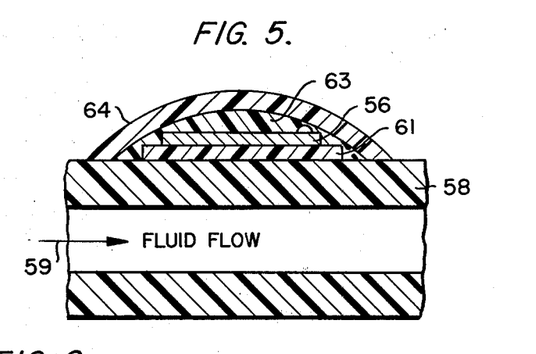
FIG. 5 is an enlarged side view of the basic components of the temperature sensor secured to the flow containing conduit.
Figure 6:
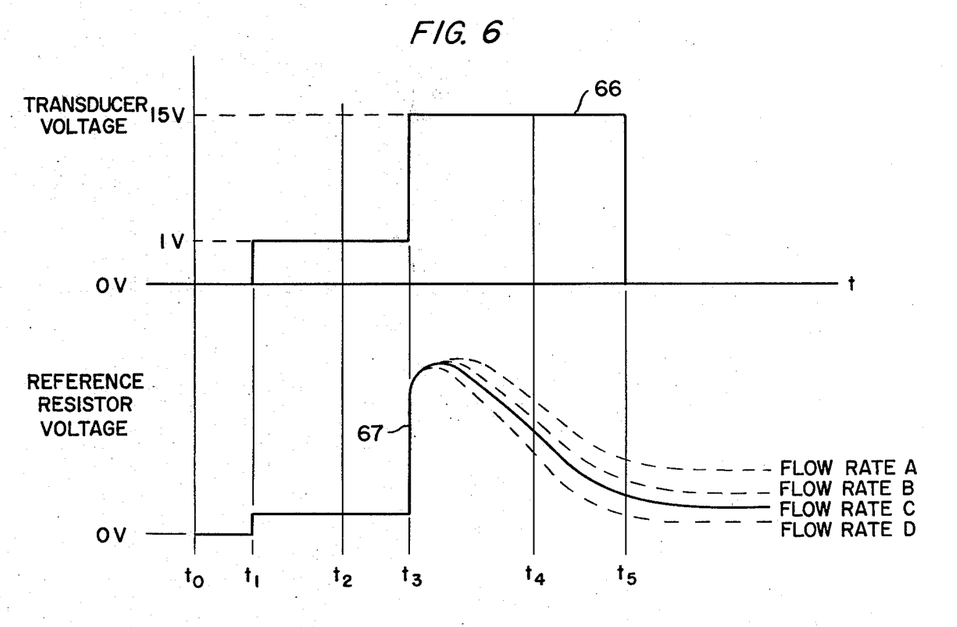
FIG. 6 illustrates a typical transducer excitation sequence and the family of voltages developed across the reference resistor as a function of flow and time.

In FIG. 1, the system according to the invention is designated by the reference numeral 10, and includes a flow transducer 12 which, in practical application, comprises a temperature sensor, a portion of the flow containing conduit, and the thermal and protective coatings, as are described in greater detail in connection with FIGS. 4 and 5. A source of low voltage 14 and a source of high voltage 15 are arranged to be sequentially applied to the flow transducer 12 under the control of a pulse controller 18. As illustrated, the pulse controller 18 controls a switching device 20 in circuit with the input of the flow transducer 12 to provide a signal to the transducer 12 as is shown in FIG. 6.

An output from the flow transducer is connected to a reference resistor 22, while another output from the flow transducer 12 is connected to a data analyzer 24. In addition, the output of the reference resistor 22 is also connected to the data analyzer 24 which is also controlled by the pulse controller 18. The results of the calculations by the data analyzer 24 are displayed in a data display device 26. If the results of the analysis by the data analyzer 24 are outside of the predetermined limits, an alarm 28 may be actuated to advise of an abnormal state.

In operation, a low voltage signal, for example, on the order of one volt, from the low voltage source 14 is provided to the flow transducer 12 at the command of the pulse controller 18. That low voltage signal produces a voltage drop across the flow transducer 12 of a measurable magnitude which signal is provided to the data analyzer 24. The output signal from the flow transducer 12 also produces a voltage drop across the reference resistor 22, which voltage signal is also provided to the data analyzer 24. Under the influence of the pulse controller 18, the voltage drop across the flow transducer 12 and the voltage drop across the reference resistor 22, upon the application of a low voltage signal to the flow transducer, are stored in the data analyzer 24 for later consideration.

Thereafter, a high voltage signal, for example, on the order of 15 volts, from the high voltage source, is provided at the command of the pulse controller 18 to the flow transducer 12. The flow transducer exhibits a markedly different response to the applied voltage, as does the reference resistor. The voltage drop across the flow transducer 12 and the reference resistor 22 under the application of a high voltage signal to the flow transducer, are also provided to the data analyzer 24. The data analyzer 24, under the control of the pulse controller 18, measures those inputs and analyzes the wave form in order to calculate the Reynolds Number and derive the mass flow rate therefrom. Subsquent actions of the data analyzer 24 are programmed to display the data on the display 26 and/or to actuate an alarm 28.

Figure 2:
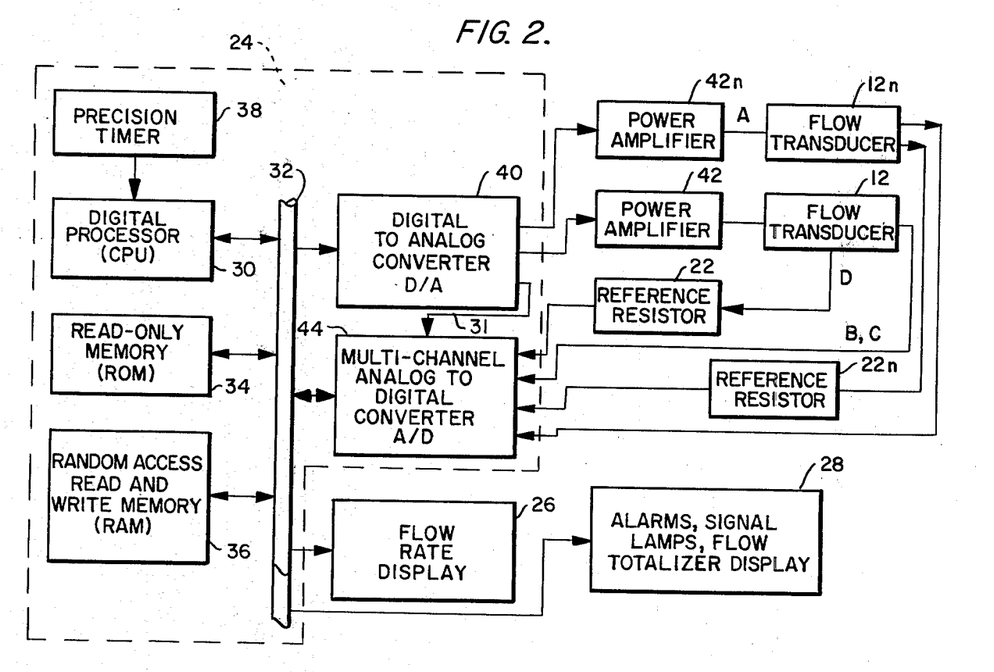
FIG. 2 is a more detailed block diagram of the components of the system according to the invention showing one convenient embodiment for calculating the Reynolds Number and deriving the mass flow rate from a controlled excitation of the flow transducer and the reference resistor which may be used for multiple flow channels.

FIG. 2 is a block diagram of the apparatus according to the invention in combination with the data analyzer.

The data analyzer 24 includes a digital processor (CPU) 30 which is the center for commanding the data analysis and computation and controlling the application of the high and low voltage signals to the flow transducer 12. By way of example, the CPU may be an Intel 8085 microprocessor. The CPU 30 is connected to a common bus 32 such as a parallel circuit multi-connector printed circuit board. A read-only memory (ROM) 34 also is connected to the common bus 32. By way of example, the ROM may be an Intel 2516 device. The ROM 34 contains all the program and mathematical constants in a randomly-accessible but read only storage. Similarly, a random access read and write memory (RAM) 36 is also connected to the common bus 32. The RAM 36 is used for temporary storage of measured and calculated values, as will be further explained in connection with FIG. 7. By way of example, the RAM may be an Intel 2414 device and, typically, the RAM 36 may be made up of one or more Intel 2414 devices. A precision timer 38 supplies precision timing signals to the CPU 30. Any type of precision timer 38, such as a precision clock oscillator or a precision squaring circuit for line frequency, may serve as a precision timer 38 for the apparatus.

The data analyzer 24 also includes a multi-channel digital-to-analog (D/A) converter 40 having its outputs connected to a plurality of power amplifiers 42, one of which is respectively in circuit with each of the flow transducers 12 ... 12n. Because each of the respective flow transducer circuits is similar, the operation of only one will be described in detail, it being understood that each flow transducer circuit includes a power amplifier 42, a flow transducer 12, and a reference resistor 22 connected in series between the D/A converter 40 and the A/D converter 44. The outputs from a plurality of flow transducers 12 are preferably connected to a single reference resistor 22, as long as the channels are individually sampled.

A multi-channel analog-to-digital (A/D) converter 44 receives, for each channel, the output from the reference resistor 22 and the flow transducer 12. As above, the A/D converter 44 is capable of receiving n channels, each of which includes the components previously described. A suitable device for use as either the D/A converter 40 or the A/D converter 44 is an Analog Device Model RTI-1225.

As previously described generally in connection with FIG. 1, the flow rate display 26 is connected to the common bus 32, as is the alarm 28. Other output devices such as signal lamps, a flow totalizer display, and the like, may also be provided to the output of the flow meter.

The data analyzer 24 and the circuit of FIG. 2 are programmed according to the program set forth in FIG. 7 and the operation of the circuit will be described in greater detail following the discussion of FIGS. 3-6.

Briefly, by way of introduction, the precision timer 38 supplies precise timing signals to the CPU 30. The D/A converter 40 transforms digital data from the CPU 30 into analog voltages for the power amplifier 42 in each flow transducer series circuit. The power amplifier in each series circuit provides the required power to the low impedance (typically 50 ohms) flow tranducer 12. The A/D converter 44 transforms analog signals from the flow tranducer 12 and the reference resistor 22 into digital values for the CPU 30 to analyze. The flow rate display 26, alarms 28, signal lamps, flow totalizer display and the like, are any of various methods of displaying or recording the results of the analysis and inputting operator instructions. The system elements as shown in FIG. 2 enable the CPU 30, according to the predetermined schedule shown in FIG. 7, to apply various voltages to the flow transducer 12, analyze the total system response, compute the flow rate, and signal displays or demands for subsequent action by others.

Figure 3:
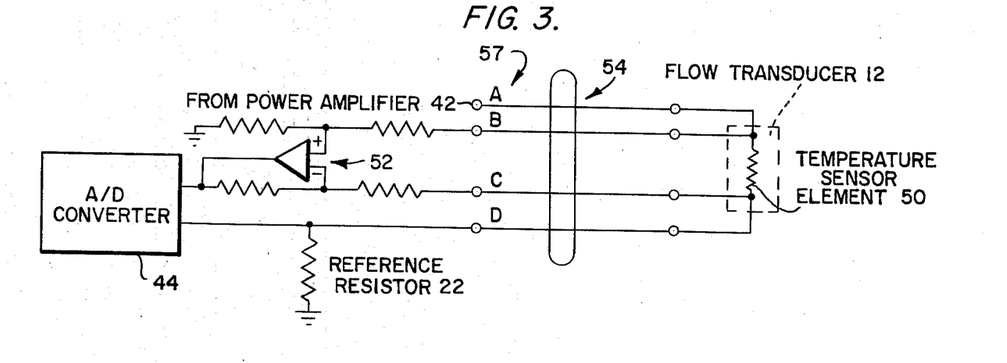
FIG. 3 is an electrical schematic of the transducer sensor, the reference resistor, and the associated circuit elements of the flow transducer according to the invention.

FIG. 3 is an electrical schematic of the flow transducer 12 which includes a temperature sensitive element 50, arranged according to the connections shown. An operational amplifier 52 is connected in parallel with the temperature sensor 50 through an interconnecting cable, designated generally by the reference numeral 54. For ease in comparison, the four leads of the cable 54 have been designated with the letters A, B, C, D. The operational amplifier 52 serves to convert the analog voltages from the transducer cable 54 into a single voltage equal to the IR drop across the temperature sensor element 50 in the flow transducer 12. Voltage scaling may also be accomplished with the operational amplifier circuit 52 to match the A/D converter. In sum, one leg A of the cable is connected to the power amplifier 42. Two legs B, C of the cable are connected to the temperature sensitive element 50 and to the operational amplifier 52. The fourth leg D of the cable 54 is connected to the reference resistor 22 and the voltage across the reference resistor 22 and the output of the operational amplifier 52 provide the inputs to the A/D converter 44.

Figure 4A:
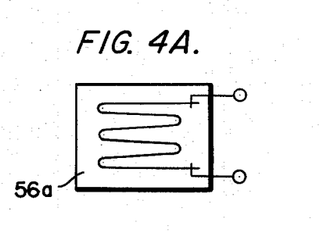
FIG. 4A depicts a wire-type temperature sensor which may alternatively be used in the flow transducer in place of the foil-type temperature sensor.

In its preferred embodiment, the temperature sensor may be a foil or wire-type temperature sensor in patterns similar to those known to the strain gage art. In FIG. 4A, a wire-type temperature sensor is designated by the reference numeral 56a, for purposes of illustration, while in FIG. 4, a foil-type temperature sensor 56 is bonded to a conduit 58, such as a section of the process piping, containing the flow to be quantified. The fluid flow is generally designated by the arrows 59. A cable connector 57 is connected to the temperature sensor as is also seen in FIG. 3.

The temperature sensor 56, as is presently known in the art, is a low thermal mass device made from a material with a high resistance characteristic as a function of temperature. Typical materials in temperature sensors are nickel or platinum in very thin wire (FIG. 4A) or etched foils (FIG. 4). In use, the sensor is bonded according to techniques known in the art as shown in FIG. 5, to the flow conduit 58 with a thin layer 61 of epoxy or ceramic and covered with two or more layers 63, 64 of protective material, such as an epoxy resin. The purpose of the epoxy covering layers 63, 64 is to provide physical protection for the sensor 50 and to provide a thermal barrier from the surrounding environment.

FIG. 6 shows a typical transducer excitation sequence, designated by the reference numeral 66, and the voltage developed across the reference resistor, designated by the reference numeral 67, according to the invention. At time $t_0$, when there is no voltage applied to the transducer 12, an A/D conversion is made for all input channels and the data are stored as a zero input voltage reference check. At time $t_1$, a low voltage, on the order of typically one volt, is applied to excite the transducer 12. The magnitude of the low voltage is selected so that there is a sufficient circuit sensitivity for accuracy without significant self-heating of the temperature sensor 50 in the flow transducer 12. This is a measurement technique well known in resistance temperature detector (RTD) technology.

At time $t_2$, an A/D conversion is made and the temperature of the flowing fluid is determined by the solution of the formulae (3), (4), and (5) as follows:

$$R_{TD2} = R_1 \cdot \frac{D_{1,2} - D_{1,1}}{D_{0,1} - D_{0,2}}$$

where:
$R_{TD2}$ is the resistance of the temperature sensor at time $t_2$;
$R_1$ is the resistance of the reference resistor;

$D_{1,2}$ is the digital representation of the IR drop across the temperature sensor at time $t_2$;

$D_{1,1}$ is the digital representation of the IR drop across the temperature sensor at time $t_1$ (the zero check);

$D_{0,2}$ is the digital representation of the IR drop across the reference resistor at time $t_2$; and $D_{0,1}$ is the digital representation of the voltage across the reference resistor at time $t_1$ (the zero check).

$$T_{e2} = a + bx + cx^2 + dx^3 + ex^4 + fx^5 + gx^6 \quad (4)$$

where:

$T_{e2}$ is the temperature of the temperature sensor at time $t_2$; and a, b, c, d, e, f, and g are the coefficients of a sixth order equation describing the resistance characteristics as a function of temperature for the material of the temperature sensor; and $$X = R_{TD2}/R_{TD0} \quad (5)$$

where:

$R_{TD0}$ is the known resistance of the temperature sensor at a reference temperature corresponding to the sixth order equation coefficients. This computational step will be better understood from a review of FIG. 7 and the accompanying text.

At time $t_3$, the transducer excitation voltage is raised in a step function to a voltage high enough to produce significant self-heating at the transducer temperature sensor. This will produce a voltage pattern across the reference resistor as shown in FIG. 6 by curve 67. Initially, this voltage will rise sharply at $t = t_3$, responding to the sharp rise in the transducer excitation voltage of curve 66. As the transducer temperature sensor self-heats, its resistance will increase and the voltage developed across the reference resistor will decrease, lowering the voltage drop across the series-connected reference resistor.

The reference resistor does not experience similar self-heating. Typically, the value of the reference resistor is low, on the order of 10 ohms, such resistors are physically large, and have virtually a zero temperature coefficient. Thus, the self-heating effects of the reference resistor are minimized, if not eliminate.

The shape of the curve 67 of the voltage developed across the reference resistor is a function of the thermal mass affected by the total heat distribution and by the steady state equilibrium which would be developed if allowed to continue. The energy supplied to the temperature sensor 50 in the flow transducer 12 in the form of resistance heating will be balanced by the heat flow into the temperature sensor environment. With one side of the temperature sensor covered by a thermal insulation layer, as described, practically all the heat loss is transferred into the pipe wall 58 and through the wall 58 into the flowing fluid 59.

The equilibrium condition of this energy transfer is described by equation (1) above with units of energy per time per degree differential, typically Joules per second per degree Celsius or watts per degree Celsius.

At time $t_4$, measurements are again made of the voltage drop across the temperature sensor 50 and across the reference resistor 22 and the temperature of the temperature sensor 50 determined again by the utilization of the equations (3), (4), and (5) above, with corresponding changes to the time reference subscripts. In addition, the power applied to the temperature sensors is calculated in watts. Subsequently, at time $t_5$, the transducer excitation is removed, completing the pulse cycle.

An alternative sequence is to store the measured data in the RAM 36 and do all calculations subsequent to $t_5$. This temporary storage will allow a more rapid sequence in the time intervals, an important factor in multi-transducer systems.

Figure 7:
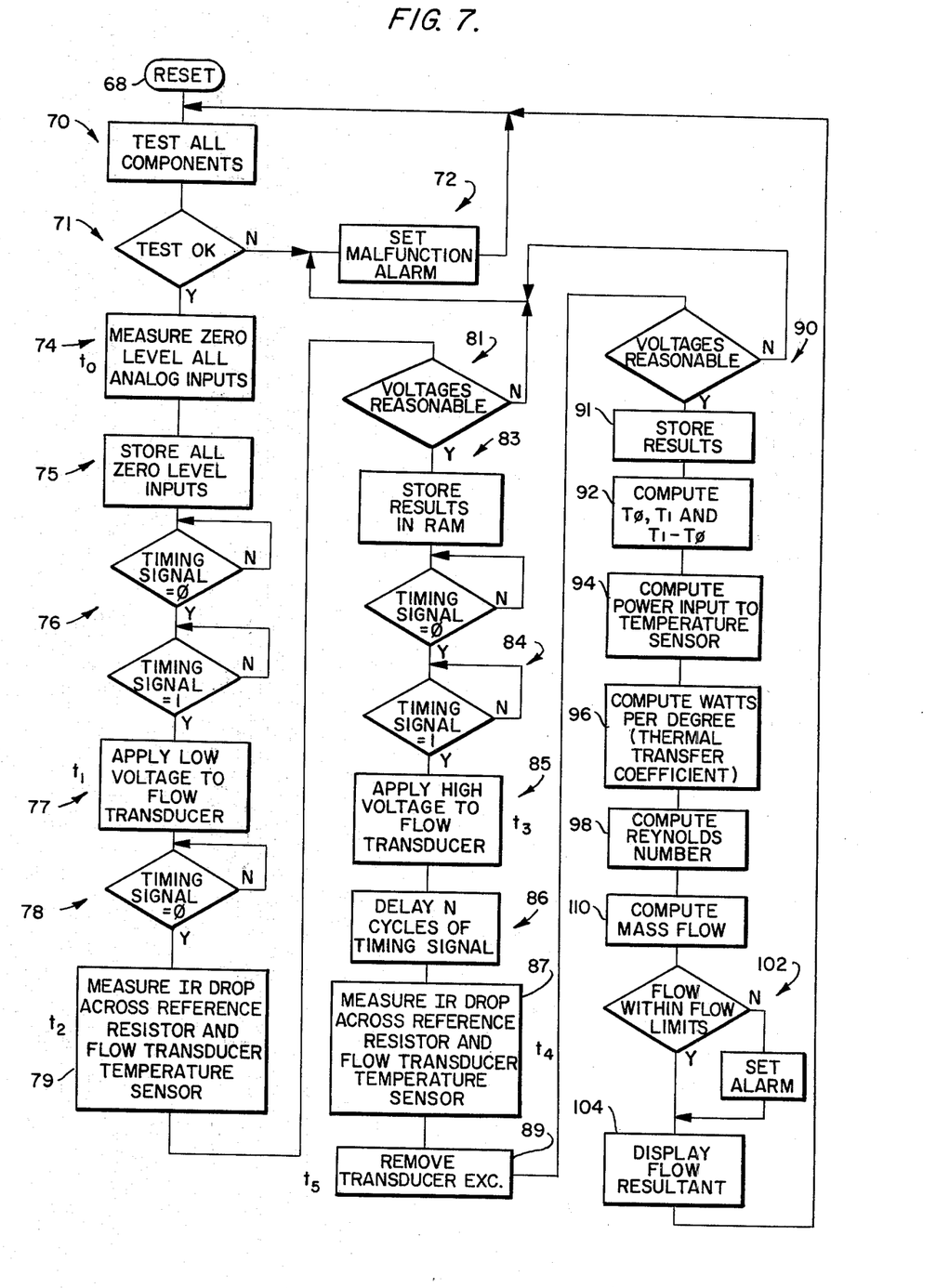
FIG. 7 is a flow diagram of the program sequence from the embodiment of FIG. 2.

FIG. 7 is a detailed program for the circuit of FIG. 2 to produce the wave forms of FIG. 6 and to calculate the mass rate of flow through the conduit 58 from the data obtained from the flow transducer.

At the initiation of the measurement cycle, the CPU 30 is reset (step 68) so that all data from previous flow measurements are cleared. Initially, all components of the circuit are tested (step 70) for malfunction by reading and writing controlled data into all memory locations of RAM 36, reading and summing all memory locations in ROM 34, and comparing the summation of the read data from ROM 34 with a predetermined value stored in ROM 34.

In addition, during the test sequence of step 70, the CPU 30 outputs a predetermined digital value through the common bus 32 on one of the channels of the D/A converter 40. The analog voltage from the D/A converter 40 is provided on a loop 31 (FIG. 2) as an input to one of the channels of the A/D converter 44 to be read by the CPU 30. If the values agree, the functionality of the converters 40 and 44 is ascertained. If the test is satisfactory (step 71) the unit is ready for further sequencing. However, if the test is unsatisfactory, the CPU 30 sets a malfunction alarm (step 72), typically a flashing light. In that case, the system resets and the test sequence is restarted.

When the test results are satisfactory, the CPU 30 commands a measurement of the zero level of all analog inputs (step 74). These data are stored as zero offset references in the RAM unit 36 (step 75).

As indicated by the reference numeral 76, the CPU 30 samples the output from the precision timer 38 in such a way that the leading edge of the timing signal is logically detected. This occurs by repetitively sampling the timing signal first to determine that the timing signal is at a logical zero and then continuously sampling until the signal goes to a logical one. This sampling detects the leading edge of the timing signal when it is transferred from a logical zero to a logical one. When this transition occurs, as shown by reference numeral 76, a low voltage is applied to the flow transducer 12 at time $t_1$ as shown in FIG. 6 (step 77). Thus, at time $t = t_1$, the CPU 30 reads the ROM unit 34 to retrieve a preset constant and apply it to the D/A convertor 40 to produce an analog output signal of the predetermined low voltage value. This predetermined low voltage value is provided through the power amplifier 42 to the flow transducer 12 as has been explained above.

As indicated by the sequence designated by the reference numeral 78, following the time $t = t_1$, the CPU 30 samples the timing signal from the precision timer 38 to determine the trailing edge of the timing logic signal. When the logic signal goes from a logical one to a logical zero, the CPU 30 commands the measurement, at time $t = t_2$, of the IR drop across the reference resistor and across the flow transducer temperature sensor (step 79). The CPU 30 commands the conversion of a channel in sequence by outputting to the A/D converter 44 the number of the desired channel. As instructed by the ROM unit 34, the CPU 30 samples each channel of the A/D converter 44 until it is determined that the conversion is complete as signaled by the A/D converter 44. At that time, the output of the A/D converter 44 is a digital representation of the analog signals representing the voltage drop across the flow transducer 12 or the reference resistor 22 under the influence of a low voltage as previously described.

As indicated by reference numeral 81, the voltages obtained across the flow transducer 12 and the reference resistor 22 are tested against predetermined limits to determine their resonableness and to insure the correct functioning of the components in the channel subjected to the low voltage.

If the voltages are not within predetermined limits, the malfunction alarm is actuated (loop 72) and the system is reset. If the voltages are reasonable, the CPU 30 commands the storage of the output of the A/D converter 44 in the RAM unit 36 (step 83).

As indicated in the step identified by the reference numeral 84, the leading edge of the timing signal from the precision timer 38 is determined, in the same manner as previously described in connection with step 76.

When the leading edge has been determined at time $t=t_3$, a high voltage signal is applied to the flow transducer 12 (step 85) in the same manner as the low voltage signal was commanded to be applied as described in connection with step 77 at time $t=t_1$. Thus, at time $t=t_3$, a high voltage signal, on the order of 15 volts (FIG. 6), is applied to a selected channel corresponding to the selected flow transducer.

As can be seen in FIG. 6, the decay of the reference resistor voltage as a function of time subsequent to $t=t_3$ is shown as a typical curve. As illustrated, a family of curves having similar decay characteristics are derived by the use of the flow meter according to the invention at different flow rates (labeled flow rate A through flow rate D).

Step 86 in the program sequence of FIG. 7 determines the time delay between time $t_3$ and time $t_4$, which time delay is based upon an analysis of the characteristics of the flow meter at calibration. As can be seen in FIG. 6, each of the curves in the family of curves has a similar shape and approaches a voltage reading, representative of the flow rate asymptotically. It has been found that it is unnecessary to wait for total stabilization of the heat pattern to develop in order to provide usable readings. Thus, one of the significant advantages of this flow meter is that it maintains sufficient accuracy by sampling the data prior to the stabilization of the curves and, in effect, predicting the stabilization voltage level. Since the phenomena are highly repeatable, and the family of curves are similar for different flow rates, an arbitrary time between $t=t_3$ and the end stabilization can be selected based upon required resolution for the particular installation.

To determine this delay, the CPU 30 in step 86 counts a predetermined number of cycles of the signal from the precision timer 38 before commanding (step 87) the measurement of the IR drop across the reference resistor and the flow transducer sensor at time $t=t_4$ (see also FIG. 6).

At time $t=t_5$, the CPU 30 commands (step 89) the removal of the transducer excitation, as can be seen in FIG. 6. The time interval between $t_4$ and $t_5$ is relatively small compared to the interval between $t_3$ and $t_4$. Thus, the transducer excitation voltage can be removed immediately following the reading of the last channel for that transducer.

Thereafter, as indicated by step 90, the voltages developed are examined for reasonableness in the manner like that described in connection with step 81, which examination evaluates the reasonableness of the voltages under the low voltage conditions. Thereafter, the results are stored (step 91) in the RAM unit 36 in a manner like that described in connection with step 83.

Having stored relative digital voltage values for the flow transducer and the reference resistor, at times $t_2$ and $t_4$, corrected for the zero offset of the system, if any, the CPU 30 then commands (step 92) the computation of the process temperature, the high excitation temperature, and the difference between the two temperatures, according to the equations (3), (4), and (5).

In step 94, the power input to the temperature sensor at time $t=t_4$ is computed by knowing the voltage applied to the temperature sensor at time $t_4$ and the resistance of the temperature sensor at time $t_4$, as previously calculated, and dividing the square of the applied voltage to the temperature sensor by the calculated resistance value.

From the results of step 94, the watts per degree are computed as commanded by the CPU 30 in step 96 to provide the thermal transfer coefficient in watts per degree. The CPU 30 then commands the computation of the Reynolds Number in step 98 according to a transposition of equation (1).

Once the Reynolds Number has been computed, according to equation (1), as commanded in step 98, the mass flow can be computed using the Reynolds Number in equation (2). If necessary or desirable, the computations can be adjusted to take into account the density and viscosity variations with temperature by utilizing look-up tables or other common techniques. Thereafter, according to step 102, the results are examined to determine whether the flow is within reasonable flow limits and, if not, an alarm 28 is actuated. The results are displayed as commanded in step 104; after which the system resets to start another cycle.

The steps in the sequence set forth in FIG. 7 have been described in end results without detailed treatment of all of the operational steps actually performed by the CPU 30 to carry out the function described. It is clear that the programming of the CPU 30 in cooperation with the elements described in connection with FIG. 2 to carry out the functions as described is within the skill of the art.

As an alternative embodiment, the temperature sensor may be located on the interior of a probe which is inserted into and secured to the wall of the fluid-carrying conduit. In this respect, the configuration of the sensor within a probe is like that currently known to the art and the teachings of this invention are applicable to this alternate configuration to that shown in FIGS. 4 and 5.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. In an apparatus for measuring a physical characteristic of a material, the combination comprising:

a temperature sensor having an electrically resistive component for measuring a physical characteristic of the material;

current sensing means in circuit with the resistive component of the temperature sensor for sensing current and producing an electrical signal representative thereof; and electrical means for first applying a first electrical signal to the temperature sensor to produce resulting first electrical signals from the temperature sensor and the current sensing means respectively, then applying in rapid succession a second electrical signal different from said first electrical signal to the temperature sensor to produce resulting second electrical signals from the temperature sensor and the current sensing means respectively, said first and second resulting electrical signals being electrical representations of a physical characteristic of the material measured by said temperature sensor.

2. The combination as set forth in claim 1 wherein said apparatus is further characterized in that the physical characteristic measured is the mass rate of flow of a fluid material and further includes a flow transducer which includes said temperature sensor.

3. The combination set forth in claim 2 wherein said temperature sensor is secured to a fluid-carrying conduit containing a flow of fluid material whose mass flow rate is to be determined and the flow transducer further includes a protective covering over the temperature sensor and a portion of the fluid-carrying conduit.

4. The combination set forth in any one of claims 1, 2, or 3 wherein said temperature sensor comprises a high resistivity, metallic foil.

5. The combination set forth in any one of claims 1, 2, or 3 wherein said temperature sensor comprises a thin, high resistivity, metallic wire.

6. The combination of any of claims 1, 2, or 3, wherein said electrical means is further characterized in that said first electrical signal is a low voltage signal, said second electrical signal is a higher voltage signal, said resulting first electrical signals and said resulting second electrical signals are voltage drops across said temperature sensor and a voltage signal from said current sensing means under conditions of low voltage excitation and high voltage excitation respectively.

7. The combination of claim 2 further including means for calculating the rate of flow of the fluid material utilizing the resulting first electrical signals and the resulting second electrical signals.

8. The combination as set forth in claim 6 further including means for calculating the flow rate of the fluid utilizing the resulting first electrical signals and the resulting second electrical signals, wherein said calculating means has as its input data said first and said second resulting electrical signals, the differences between said first and said second resulting electrical signals being a representation of the power transferred to said fluid material which representation is a measure of the fluid flow rate of said fluid material.

9. The combination as set forth in claim 3 wherein said temperature sensor is located in a probe inserted into and secured to said fluid-carrying conduit.

10. In an apparatus for measuring the mass rate of flow of a fluid material in a fluid-carrying conduit of the type comprising a flow transducer which includes a temperature sensor secured to said conduit and covered with a protective material and a current sensor in electrical circuit with said temperature sensor, the improvement comprising:

electrical means for first applying a first electrical signal to the temperature sensor to produce resulting first electrical signals from the temperature sensor and the current sensor respectively, then applying in rapid succession a second electrical signal to the temperature sensor to produce resulting second electrical signals from the temperature sensor and the current sensor respectively, said first and said second resultant electrical signals being electrical representations of a physical characteristic of the material measured by said temperature sensor.

11. The combination as set forth in claim 10, wherein said apparatus is further characterized in that the physical characteristic measured in the mass rate of flow of a fluid material.

12. The combination set forth in claim 11, wherein said temperature sensor comprises a high resistivity, metallic foil.

13. The combination set forth claim 11, wherein said temperature sensor comprises a thin, high resistivity, metallic wire.

14. The combination set forth in claim 10, wherein said electrical means is further characterized in that said first electrical signal is a low voltage signal, said second electrical signal is a high voltage signal, said resulting first electrical signals and said resulting second electrical signals are voltage drops across said temperature sensor and said current senor under conditions of low voltage excitation and high voltage excitation respectively.

15. The combination as set forth in claim 10 further including means for calculating the rate of flow of the fluid material utilizing the resulting first electrical signals and the resulting second electrical signals.

16. The combination as set forth in claim 14 further including means for calculating the flow rate of the fluid utilizing the resulting first electrical signals and the resulting second electrical signals, wherein said calculating means has as its input data said first and said second resulting electrical signals, the difference between said first and said second resulting electrical signals being a representation of the power transferred to said fluid material which representation is a measure of the fluid flow rate of said fluid material.

17. The combination as set forth in either of claims 15 or 16 wherein said calculating means includes a plurality of channels, at least one of which is in electrical circuit with the combination of a temperature sensor and a current sensor in a plurality of combinations of temperature sensors and current sensors.

18. The combination as set forth in either of claims 10 or 11 wherein said temperature sensor is located in a probe inserted into and secured to said fluid-carrying conduit.

19. A method of determining the mass rate of flow of a fluid material in a fluid-carrying conduit with a combination of a flow transducer which includes a temperature sensor secured to said conduit and covered with a protective material and a current sensor in electrical circuit with said temperature sensor, comprising the steps of:

applying a first electrical signal to the temperature sensor to produce resulting first electrical signals from the temperature sensor and the current sensor; and applying a second electrical signal different from said first electrical signal to the temperature sensor in rapid succession to the application of said first electrical signal to produce resulting second electrical signals from the temperature sensor and the current sensor, the first and second resulting electrical signals being electrical representations of a physical characteristic of the fluid material measured by said temperature sensor.

20. The method as set forth in claim 19 further including the step of calculating the rate of flow of the fluid material utilizing the resulting first electrical signals and the resulting second electrical signals.

21. The method as set forth in either of claims 19 or 20 wherein the applying step is further characterized in that said first electrical signal is a low voltage electrical signal and said second electrical signal is a higher voltage electrical signal, and the resulting first and resulting second electrical signals are the respective voltage drops across said temperature sensor and said reference resistor under conditions of low voltage excitation and high voltage excitation respectively.

22. In an apparatus for measuring a physical characteristic of a material, the combination comprising:
a temperature sensor having an electrically resistive component for measuring a physical characteristic of the material;
a reference resistor in circuit with the resistive component of the temperature sensor; and
electrical means for applying a first, low voltage, electrical signal to the temperature sensor to produce resulting first electrical signals from the temperature sensor and the reference resistor respectively, then applying in rapid succession a second higher voltage electrical signal to the temperature sensor to produce resulting second electrical signals from the temperature sensor and the reference resistor respectively, said first and said second resulting electrical signals being voltage drops across said temperature sensor and said reference resistor under conditions of low voltage excitation and high voltage excitation respectively and electrical representations of a physical characteristic of the material to be measured by said temperature sensor.

23. The combination as set forth in claim 22 wherein said apparatus is further characterized in that the physical characteristic measured is the mass rate of flow of a fluid material and further includes a flow transducer which includes said temperature sensor.

24. The combination as set forth in claim 23 wherein said temperature sensor is secured to a fluid-carrying conduit containing a flow of fluid material whose mass flow rate is to be determined and the flow transducer further includes a protective covering over the temperature sensor and aportion of the fluid-carrying conduit.

25. The combination as set forth in claim 22 further including means for calculating the flow rate of the fluid utilizing the resulting first electrical signals and the resulting second electrical signals, wherein said calculating means has as its input data said first and said second resulting electrical signals, the difference between said first and said second resulting electrical signals being a representation of the power transferred to said fluid material which representation is a measure of the fluid flow rate of said fluid material.

26. In an apparatus for measuring the mass rate of flow of a fluid material in a fluid-carrying conduit of the type comprising a flow transducer which includes a temperature sensor secured to said conduit and covered with a protective material and a reference resistor in electrical circuit with said temperature sensor, the improvement comprising:
electrical means for first applying a first, low voltage, electrical signal to the temperature sensor to produce resulting first electrical signals from the temperature sensor and the reference resistor, then applying in rapid succession a second higher voltage electrical signal to the temperature sensor to produce resulting second electrical signals from the temperature sensor and the reference resistor, said first and said second resultant electrical signals being voltage drops across said temperature sensor and said reference resistor under conditions of low voltage excitation and high voltage excitation respectively and electrical representations of a physical characteristic of the material to be measured by said temperature sensor.

27. The combination as set forth in claim 26 further including means for calculating the rate of flow of the fluid material utilizing the resulting first electrical signals and the resulting second electrical signals.

28. The combination as set forth in claim 27 further including means for calculating the flow rate of the fluid utilizing the resulting first electrical signals and the resulting second electrical signals, wherein said calculating means has as its input data said first and said second resulting electrical signals, the difference between said first and said second resulting electrical signals being a representation of the power transferred to said fluid material which representation is a measure of the fluid flow rate of said fluid material.

29. The combination as set forth in either of claims 27 or 28 wherein said calculating means includes a plurality of channels, at least one of which is in electrical circuit with the combination of a temperature sensor and a reference resistor in a plurality of combinations of temperature sensors and reference resistors.

30. A method of determining the mass rate of flow of a fluid material in a fluid-carrying conduit with a combination of a flow transducer which includes a temperature sensor secured to said conduit and covered with a protective material and a reference resistor in electrical circuit with said temperature sensor, comprising the steps of:
applying a first, low voltage, electrical signal to the temperature sensor to produce resulting first electrical signals from the temperature sensor and the reference resistor; and
applying a second, higher voltage, electrical signal to the temperature sensor in rapid succession to the application of said first electrical signal to produce resulting second electrical signals from the temperature sensor and the reference resistor, the first and second resulting electrical signals being the voltage drops across said temperature sensor and said reference resistor under conditions of low voltage excitation and higher voltage excitation respective and electrical representations of a physical characteristic of the fluid material to be measured by said temperature sensor.

* * * * *